T. H. BOGGIS.
GAME.
APPLICATION FILED DEC. 5, 1913.
1,116,554.
Patented Nov. 10, 1914.
2 SHEETS—SHEET 1.
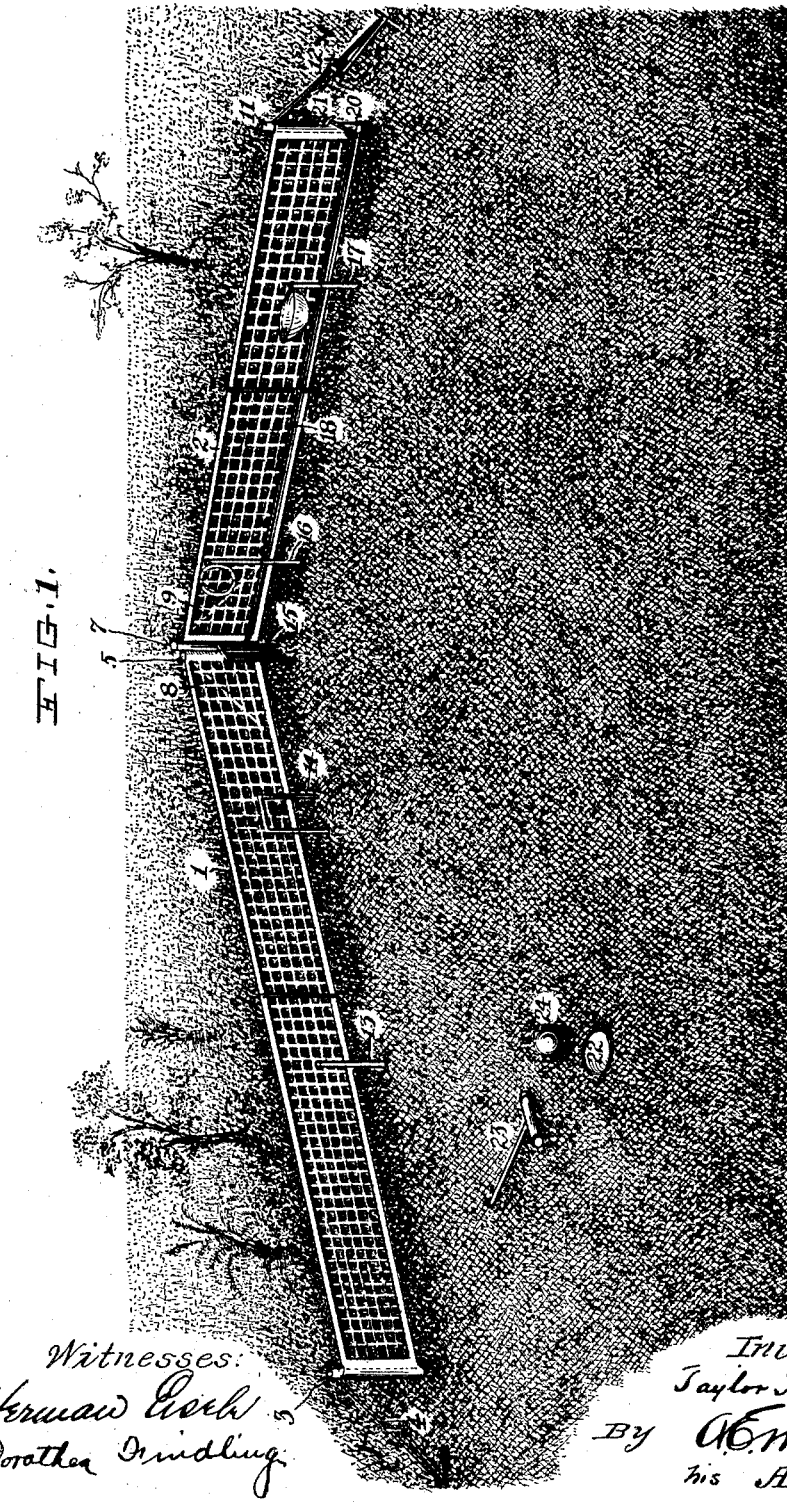
Witnesses:
Herman Eich
Dorathea Grindling
Inventor:
Taylor H. Boggis,
By A. E. Merkel,
his Attorney.

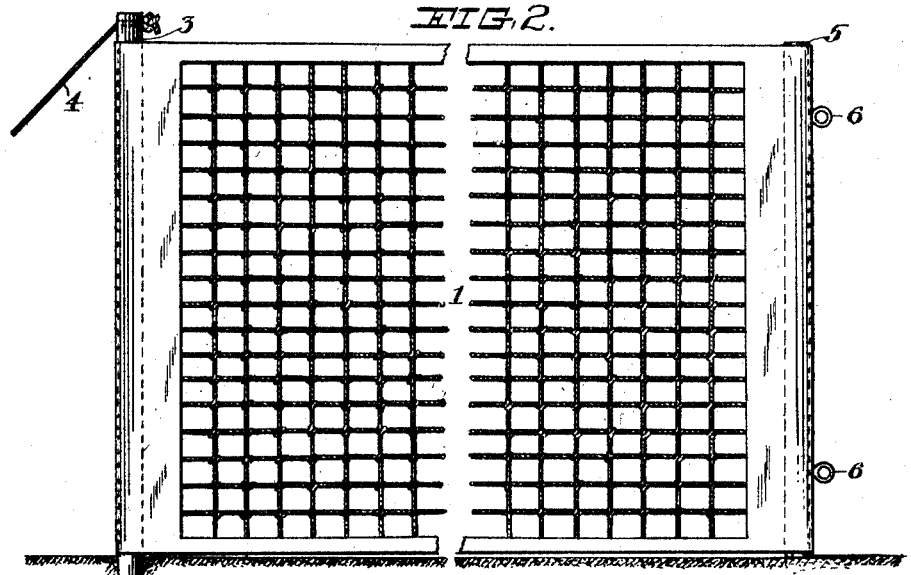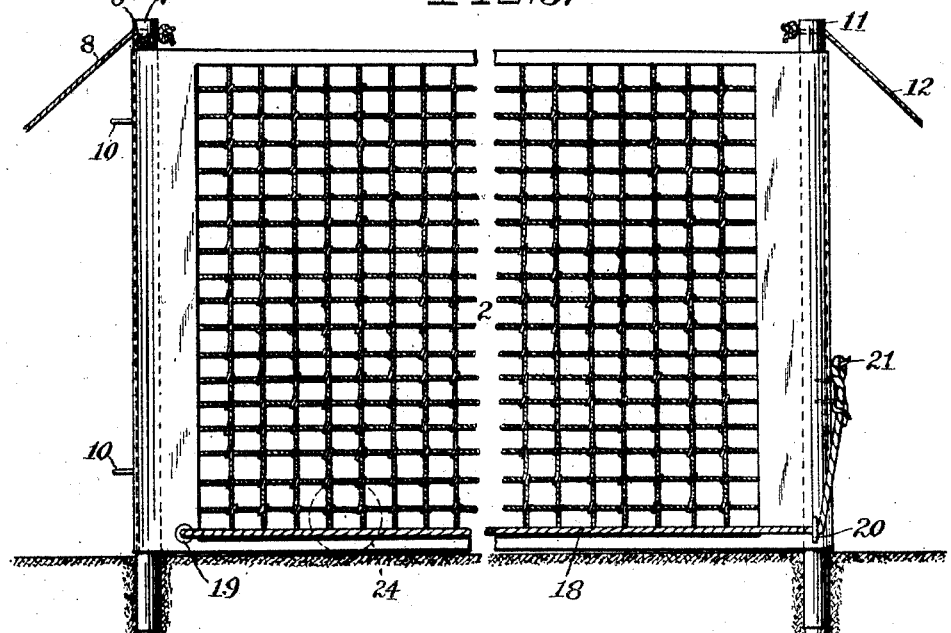

UNITED STATES PATENT OFFICE.

TAYLOR H. BOGGIS, OF CLEVELAND, OHIO.

GAME.

1,116,554.  Specification of Letters Patent.  Patented Nov. 10, 1914.

Application filed December 5, 1913. Serial No. 804,891.

*To all whom it may concern:*

Be it known that I, TAYLOR H. BOGGIS, a citizen of the United States, resident of Cleveland, county of Cuyahoga, and State of Ohio, have invented a new and useful Improvement in Games, of which the following is a specification, the principle of the invention being herein explained and the best mode in which I have contemplated applying that principle, so as to distinguish it from other inventions.

My invention relates to games, its object being to provide a game which is novel in its character and which may be played within a limited space out of doors or in doors.

The said invention consists of means hereinafter fully described and particularly set forth in the claims.

The annexed drawings and the following description set forth in detail certain means embodying my invention, the disclosed means, however, constituting but one of various mechinical forms in which the principle of the invention may be applied.

In said annexed drawings:—Figure 1 is a perspective view of the apparatus employed in my improved game, and illustrated as being set up out of doors. Fig. 2 is a broken front elevation of one of the nets forming part of the illustrated apparatus. Fig. 3 is the second net forming part of said apparatus.

The illustrated embodiment of my invention comprises two nets, a net 1, and a net 2. The net 1 is of a construction similar to that used in the game of lawn tennis and is preferably about sixteen feet in length. One end of this net is supported by means of a post 3 driven into the ground and itself supported by a guy rope 4 in the usual manner. The other end of this net is provided with an upright rod 5 of a length substantially equal to the height of the net, the lower end of this rod resting near or upon the ground. To this rod are secured two eyes 6, 6, as shown in Fig. 2.

The one end of the net 2 is provided with a post 7 which is driven into the ground and which is provided with two guy ropes 8 and 9. To this latter post are secured two hooks 10, 10, which are adapted to engage the eyes 6, 6, of the net 1. This said net 2 extends at right angles to the net 1 and its outer end is supported by a post 11 which is driven into the ground and itself supported by a guy-rope 12 in the usual manner. The guy-ropes 8 and 9 extend respectively in the direction of the nets 2 and 1, as shown in Fig. 1; and hence support the corner post 7 in an upright manner. The net 2 is preferably made about twelve feet in length.

The nets are so placed that their lower edges are in as close proximity to the ground upon which the game is played, as is feasible.

Located in the interior angle formed by the two nets and in proximity thereto, are a series of hazards 13, 14, 15, 16 and 17. These hazards may vary in character, as shown, and may be of different number. In the apparatus illustrated, hazard 13 consists of an upright post placed about one foot from the net, hazard 13 consists of an arch or wicket parallel with the net and placed substantially an equal distance from the net as the post 13. Hazard 15 is shown to be located immediately adjacent to the apex of the angle and also consists of a wicket. Hazard 16 is placed in proximity to the net 2 and consists of an upright post carrying a ring whose plane is parallel with said net 2. Hazard 17 consists of an upright post carrying a basket.

The net 2 is of the general construction of net 1, but in addition thereto has secured along the lower edge-portion, a rope 18, Fig. 3. The one end of this rope passes through an eye 19 contiguous to the inner end of the net and is secured therein by forming a knot upon the outside of the net, as will be understood. The other end of this rope passes through an eye 20 and may be adjustably secured to a cleat 21 secured to the post 11. This rope is parallel with the lower edge-portion of the net and is drawn taut so as to present an obstacle which, as compared with the body of the net, is of comparative rigidity.

Located at a suitable point within the interior angle formed by the two nets or by an imaginary extension thereof, is a cup 22, similar to the cup used in the game of golf.

In playing the game, each player is provided with a mallet 23 and a ball 24. The radius of this ball is made somewhat longer than the distance from the ground to the center of the rope 18, as shown in Fig. 3.

In playing the game with the apparatus illustrated, the ball is first placed near the cup 22 and the player by means of his mallet propels same against the net 1 in such a manner as to cause the latter to impart to the ball a rebound around the first hazard 13, the said ball being first made to pass, in being so propelled, on that side of the hazard away from the angle of the nets. After the ball has been so caused to pass around the first hazard, it is then driven so as to lodge in the cup 22, the object being to pass around the said hazard with the aid of the rebound imparted by the net, in the fewest number of strokes. After the ball has thus been holed-out, it is again placed near the cup and then caused to strike the net, pass through the hazard 14 and then holed-out as before, the object being again to effect this travel of the ball in the fewest number of strokes. The ball is then caused to pass through the hazard 15 with the aid of the rebound from the net 1. From this point on, the object is to cause the ball to pass through the ring of the hazard 16, to be then holed-out, and then to cause it to lodge in the basket 17, which lodgment marks the termination of the game. The player effecting the complete described circuit in the fewest number of strokes, wins the game.

In order to play the last two hazards, it is necessary to cause the ball to rebound in an upward direction and it is for this purpose that the comparatively rigid obstacle in the form of the taut rope 18 is provided. As the ball strikes this rope, the latter hits same below its center of gravity, as shown in dotted lines in Fig. 3, and it is then caused to travel in an upward direction and strike the net 2 at an obtuse angle. The angle of rebound imparted by the net will similarly be obtuse and cause the ball to fly upwardly and inwardly toward the hazard. By these means the ball may be caused to pass through the ring of the hazard 16 and may also be caused to rebound and fall into the basket 17.

It is obvious that the supports for the nets may be modified so as to enable the nets to be set up in doors. It is also obvious that the method of procedure as to the sequence in which the hazards are used, may be varied. The rules may also be varied so as to provide that two or more hazards may be overcome before holing-out the ball. The dimensions of the nets may also be varied to suit varying conditions, as will be readily understood. The main feature therefore, of the game, is the provision first of a rebound-surface and one or more hazards placed in proximity thereto, around which the ball may be caused to pass with the aid of the rebound from such surface, this procedure being varied in net 2 by causing the ball to rebound in an upward direction so as to pass through or into an obstacle.

Having fully described my invention, what I claim and desire to secure by Letters Patent is:—

1. In a game of the class described, the combination of a playing surface; a rebound surface projecting upwardly from said playing surface; a hazard in proximity to said rebound surface and a cup having its mouth substantially in the plane of said playing surface; said cup being removed from said rebound surface a distance greater than that of said hazard.

2. In a game of the class described, the combination of a playing surface; two upright rebound surfaces angularly related to each other; a succession of hazards in proximity to both such surfaces; and a cup having its mouth substantially in the plane of said playing surface and removed from said rebound surfaces a distance greater than that of said hazards.

3. In a game of the class described, the combination of two nets angularly related to each other; means for supporting said nets in an upward position; a plurality of stationary hazards in proximity to such nets and succeeding each other in the longitudinal direction of the latter; and a cup placed a distance from the said nets greater than that of said hazards.

4. In a game of the class described, the combination of a playing surface; two nets angularly related to each other; means for supporting said nets in an upright position; a plurality of stationary hazards in proximity to such nets and placed within the interior angle formed thereby; a cup having its mouth in substantially the same plane with such playing surface; and a ball adapted to be driven against said nets and around said hazards, said ball adapted to fit in said cup.

5. In a game of the class described, the combination of a rebound-surface; means for supporting same in an upright position; and means of comparative rigidity contiguous to and parallel with the lower edge-portion of said surface.

6. In a game of the class described, the combination of a net; means for supporting same in an upright position; and a rope placed contiguous to and parallel with the lower edge-portion of the net, said rope being in a state of comparative rigidity.

7. In a game of the class described, the combination of a net; means for supporting said net in an upright position; a rope secured in a position contiguous to the lower edge-portion of said net, one end of said rope being rigidly secured, and the other end being adjustably secured.

Signed by me, this 4th day of Dec., 1913.

TAYLOR H. BOGGIS.

Attested by—
 HERMAN EISELE,
 DOROTHEA FINDLING.

Correction in Letters Patent No. 1,116,554.

It is hereby certified that in Letters Patent No. 1,116,554, granted November 10, 1914, upon the application of Taylor H. Boggis, of Cleveland, Ohio, for an improvement in "Games," an error appears in the printed specification requiring correction as follows: Page 2, line 84, for the word "upward" read *upright;* and that the said Letters Patent should be read with this correction therein that the same may conform to the record of the case in the Patent Office.

Signed and sealed this 24th day of November, A. D., 1914.

[SEAL.]

R. F. WHITEHEAD,
*Acting Commissioner of Patents.*